Sept. 6, 1932.        H. K. THIEL        1,875,956
MULTIPLE PARALLEL FLASH LIGHT
Filed April 28, 1930
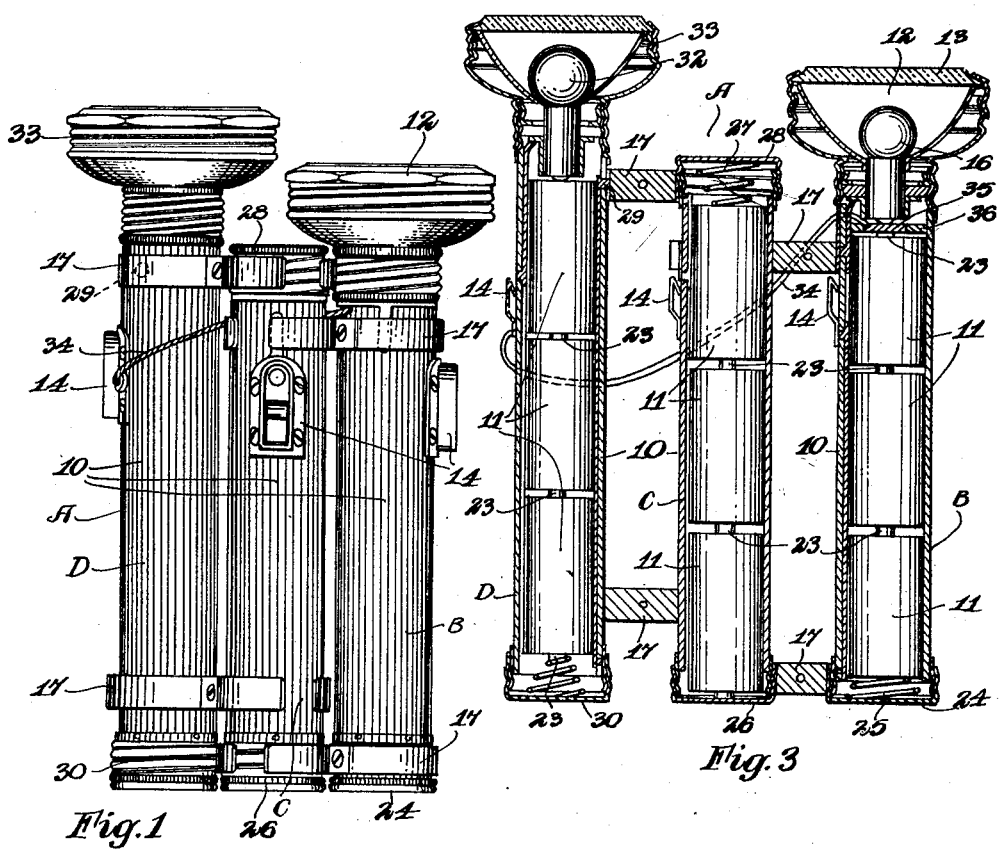
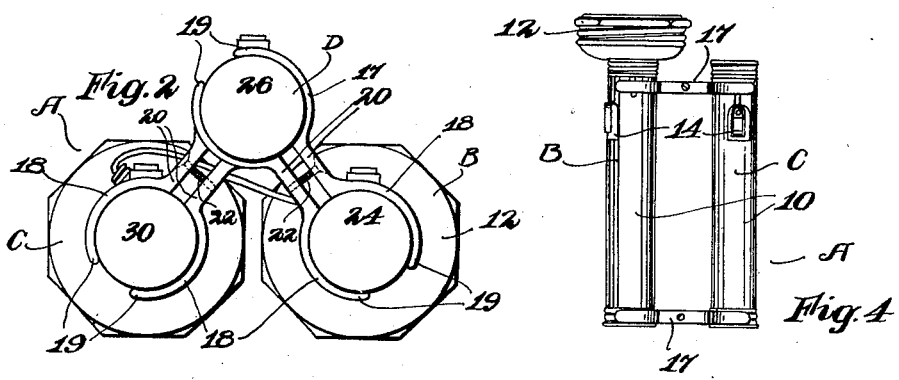
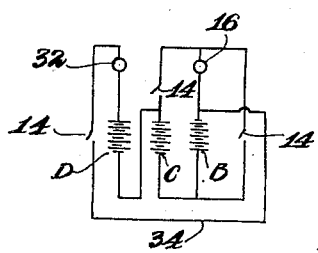
Inventor
Herman K. Thiel
By
Attorney Patented Sept. 6, 1932

1,875,956

UNITED STATES PATENT OFFICE

HERMAN K. THIEL, OF LAKELAND, MINNESOTA

MULTIPLE PARALLEL FLASH LIGHT

Application filed April 28, 1930. Serial No. 447,833.

My invention relates to an improvement in multiple parallel flashlights, wherein it is desired to provide a flash light of a compact nature adapted to furnish a beam of light which may be varied in intensity from the strength of an ordinary flashlight to several times the intensity thereof, as required for the particular task for which the light is being used.
It is my object to secure two or more casings, each provided with an individual switch to control the current from the batteries contained within the casings, by means of parallel connectors in such a manner that by manipulating the various switches, the current from the batteries in one casing, several casings, or all of the casings may be supplied to the bulb to furnish the correct degree of light intensity required for any task.
It is my object to provide a flashlight which may be easily carried. For this reason, the device is made up of several casings connected together in parallel relationship, with sufficient space between the same to allow the operator to grasp any of the casings in the hand, and to carry the light in this manner. By carrying the light by means of the casing upon which is mounted the switch for producing a desired intensity of light, the same may be turned on and off at will without having to look for the correct switch.

It is my purpose to connect two, three, or more casings together in a compact manner so that a light of the strength of any desired number of batteries may be produced. My light may be formed in the manner illustrated, employing the usual sized flashlight batteries, reflectors and casings, or may be larger in size, using batteries of a larger size.
One, two or more bulbs may be used to produce the light, a bulb suitable for the amount of current being used automatically being selected as the switch is operated. For example, when three casings are being secured together as a unit, a small bulb at the end of one of the casings produces the light when one or two sets of batteries are used. A second and larger light, suitable for the increased current, is used when the batteries of all three of the casings are put into use.

It is my object to provide a light suitable for a wide variety of uses, variable to produce the amount of light required, compact and easily carried, and requiring only easily obtained batteries and bulbs in maintenance.

Additional objects and novel features of my invention will be more clearly and fully set forth in the following specification and claims.

In the drawing forming a part of the specification:

Figure 1 is a plan view of my flashlight.
Figure 2 is an end view of the same.
Figure 3 is a diagrammatic view illustrating the method of combining the casings to provide proper electrical connections.

Figure 4 is a plan view of an alternate form of flashlight.

Figure 5 is a wiring diagram for a flashlight having three battery casings.

My flashlight A is provided with two or more battery casings 10 in which are placed flashlight batteries 11 to provide current for operating the flashlight. One of the casings 10 is equipped with a reflector head 12 and lens 13, and is wired in the ordinary manner. This particular casing 10, designated in the drawing by the letter B, is provided with a switch 14, by means of which the current from the batteries within the member B may be caused to flow into the light bulb 16 within the reflector head 12 to produce a light of a strength measured by the number and strength of the batteries within the casing B.

A second battery casing 10, designated in the drawings by the letter C, is connected to the casing B by means of a pair of parallel connectors 17. These connectors 17 are of the form illustrated in Figure 2 of the drawing, and comprise a pair of clamping members 18, each of which are formed with arcuated ends 19 joined by an intermediate portion 20 through which a bolt 22 is inserted to draw the two clamping members 18 together. The battery casings 10 are placed between the opposed arcuated ends 19 of the clamping members 18, and the bolts 22 operated to secure the casings 10 securely in position.

One terminal of the batteries 11 within the casing B is formed by the metal casing of the battery, while the other is formed by the small cylindrical projection 23 upon one end of the batteries 11. The batteries within the casing B are placed in the usual manner, with the metal casing of one battery in contact with the projection 23 upon the next. At the end of the series opposite the reflector head 12, the casing of the last battery 11 is in contact with the removable metal casing cap 24, the current being transmitted through the spring 25 secured to the cap 24. For operating the casing B as a single unit, the cap 24 is electrically connected to the switch 14 on the casing B in the usual manner.

The battery casing C likewise contains a series of batteries 11. The projection or terminal 23 of one end battery within the casing C is in contact with the removable metal cap 26 upon one end of the casing C, while the current from the battery 11 at the opposite end of the series within the casing C is adapted to be conducted through the contact spring 27 to the metal cap 28 at this opposite end of the casing C. The metal cap 28 is electrically connected to one terminal of the switch 14 upon the casing C, and the other terminal of the switch 14 is electrically connected by means of the parallel connector 17 to the metal reflector head 12 through which current may flow to one terminal of the bulb 16. As the other light bulb terminal is electrically connected with the terminal 23 upon the foremost battery within the casing B, it may be seen that if the metal caps 24 and 26, upon the casings B and C respectively, were joined together by means of a connector 17, as illustrated in the drawing, the current is permitted to flow through the batteries within the casing B, through the connector 17 to the cap 26, through the batteries 11 within the casing C, through the closed switch 14 upon the casing C, through the connector 17 to the reflector head 12, and into the bulb 16, forming a complete circuit and lighting the bulb. Thus the switch 14 upon the casing C may be operated to turn on or off the current through all of the batteries within the casings B and C, to light the bulb 16 much more brightly than would be possible by only using the batteries within the casing B.

If it is desired to provide a light stronger than that obtainable with the two casings B and C, connected as stated, and illustrated in Figure 4 of the drawing, it is possible to secure additional casings 10, such as the casing D, to the unit thus formed. If a third casing is added, the cap 28 is electrically connected by means of a connector 17 to a metal contacting lug 29 which in turn is electrically connected to the metal removable cap 30 upon the casing D. The cap 30 is in spring contact with the batteries 11 within the casing D, which in turn are in contact with one terminal of the light bulb 32 within the reflector head 33. The other terminal of the bulb 32 is connected electrically with one terminal of the switch 14 upon the casing D, the other terminal of which is connected by means of the detachable wire 34 to the metal center 35 of an insulating disc 36 which has been inserted between the batteries 11 within the casing B and the central terminal of the light bulb 16 in such a manner that the current may pass through the metal center of the disc 36 from the batteries into the bulb 16, or into the wire 34.

When the switch 14 upon the casing D is closed, the current is allowed to flow from the central terminal of the bulb 32 through the batteries 11 within the casing D, to the cap 30, through the contacting lug 29, through the connector 17 to the cap 28 upon the casing C, through the batteries within the casing C, through the cap 26, the connector 17 and the cap 24, through the batteries 11 within the casing B, through the metal center of the disc 36 and the wire 34, through the closed switch 14 upon the casing D, and to the opposite terminal of the light bulb 32, causing the bulb to light up with the current of the batteries from all three of the casings. The method of wiring is clearly illustrated in the wiring diagram, Figure 5 of the drawing.

It is obvious that my flashlight A is suitable for a great variety of purposes. By operating the proper switch 14, the intensity of the light issuing from the flashlight may be varied according to the requirements for the particular use to which the same is put. At the same time, my flashlight is economical in use, as only the current which is required at any particular time need be used. For these reasons, I believe I have filled a long felt want for a flashlight which is compact and yet powerful, is capable of producing a strong penetrating light, and yet is economical, is more powerful than any other hand flash light of which I am aware and at the same time is adapted to use standard and easily obtained repair parts.

In accordance with the patent statutes, I have described the principles of operation of my multiple parallel flashlight, and while I have endeavored to set forth the best embodiment thereof, I desire to have it understood that this is only suggestive of a means of carrying out my invention, and that obvious changes may be made within the scope of the following claims without departing from the spirit of the invention.

I claim:

1. A multiple parallel electric flashlight comprising, battery enclosing casings, adjustable bracket conductor means for holding said casings adjustably connected together and conducting current from one casing to another, electric light globes and reflectors carried by said casings, and switch means for connecting said electric light bulbs selectively in a manner to direct the energy from the batteries contained in said casings to a particular light, switch means for increasing the energy to the light, and switch means for directing all of the energy from all of the batteries in said casings to a single light.

2. An electric flashlight including, a casing, a light bulb secured to said casing, batteries within said casing, and switch means for directing current from said batteries to said bulb, a second casing, batteries in said second casing, bracket means connecting said casings together, means for conducting current from said second casing through said brackets to said first casing, a switch on said second casing, and circuit connections to conduct current from all of said batteries to said bulb when said last named switch is closed.

3. An electric flashlight including, parallel casings, batteries in said casings, bracket conducting means for holding said casings in parallel relationship, said brackets conducting current from the batteries of one casing to those of another, light bulbs on some of said casings, and switch means on each of said casings for controlling the circuit to one of said light bulbs from the batteries in one or more of said casings.

4. An electric flashlight including, a casing, batteries therein, a bulb supported thereby, a circuit through said batteries to said bulb, a switch on said casing for closing the circuit to said bulb, a second casing, batteries contained therein, means for electrically connecting said batteries in said second and first casings in series forming a second electric circuit to said bulb, a switch for closing said second circuit, a third casing, batteries therein, means for electrically connecting the batteries of said third casing with the batteries of said other casings forming a circuit, a bulb on said third casing, and a switch for closing said last named circuit, to illuminate said last named bulb by the batteries in all of said casings.

5. An electric flashlight including, a casing, a bulb supported thereby, batteries contained therein, a circuit through said batteries to said bulb, a switch controlling said circuit, a second casing, batteries therein arranged in series, a clamp electrically connecting said batteries in said first casing with those in the second casing, means for connecting the one end of the said batteries with a switch on said second casing, and clamp means electrically connecting said last named switch with said bulb completing the circuit through all of said batteries to said bulb.

HERMAN K. THIEL.